Nov. 15, 1949     C. W. KELLY     2,488,127

FRICTION HINGE

Filed Feb. 19, 1945

INVENTOR.
CLYDE W. KELLY
BY
*Whittemore Hulbert & Belknap*
ATTORNEYS

Patented Nov. 15, 1949

2,488,127

UNITED STATES PATENT OFFICE 2,488,127

FRICTION HINGE

Clyde W. Kelly, Detroit, Mich., assignor to Detroit Steel Products Company, Detroit, Mich., a corporation of Michigan Application February 19, 1945, Serial No. 578,659

6 Claims. (Cl. 16—140)

1

The invention relates to friction hinges and refers more particularly to friction hinges for closures, such as windows.

The invention has for one of its objects to provide an improved construction of friction hinge which imposes a substantially constant frictional resistance to relative angular movement of the hinge members.

The invention has for another object to provide an improved construction of friction hinge which may be readily manually adjusted to vary the frictional resistance for each adjustment and which will not become accidentally adjusted.

The invention has for a further object to provide a simple, efficient construction of friction hinge.

These and other objects of the invention will become apparent from the following description, taken in connection with the accompanying drawings, in which Figure 1 is an outside elevation, partly broken away, of a conventional form of window embodying the invention;

Figures 2 and 3 are cross sections on the lines 2—2 and 3—3, respectively, of Figure 1;

Figure 1:
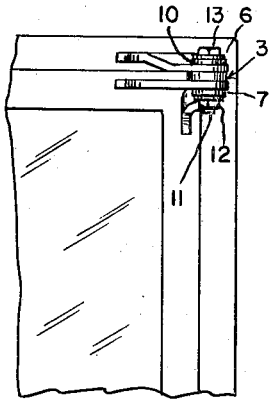
Figure 5:
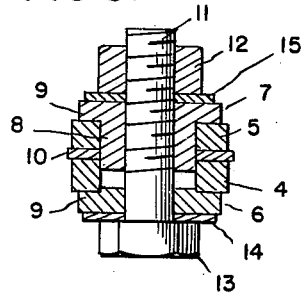
Figure 5 is an enlarged cross section on the line 5—5 of Figure 2.
Figure 6:
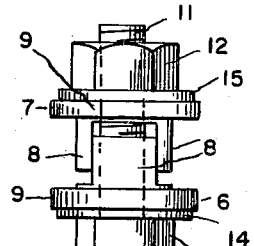
Figure 6 is an elevation of assembled parts of the friction hinge omitting the hinge members and intermediate washer.
Figure 4:
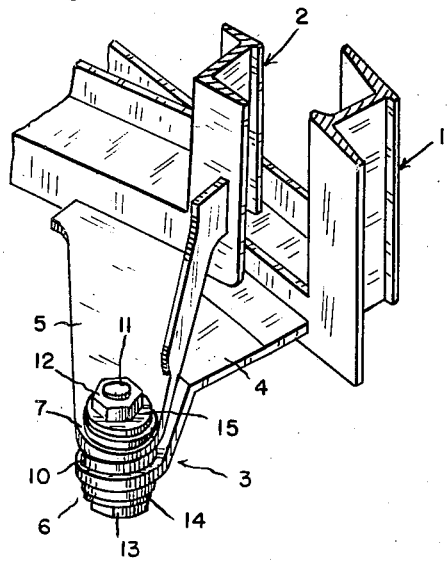
Figure 4 is a fragmentary perspective view of one corner of the window.
Figure 2:
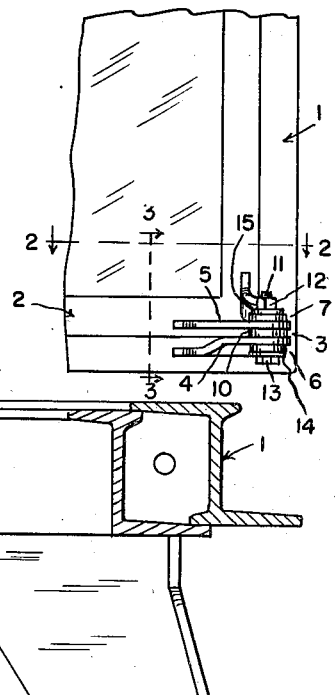
Figure 3:
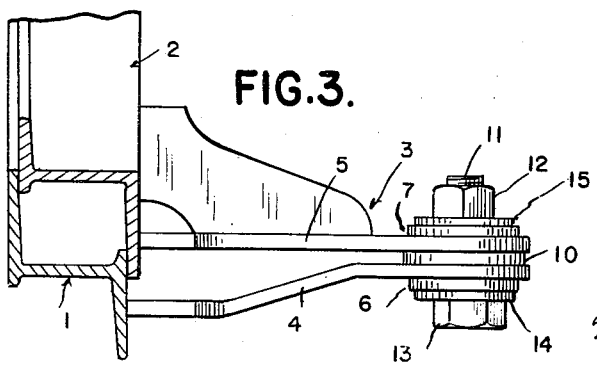

The friction hinge embodying the invention is designed for use with closures and, more particularly, windows and, as illustrated in the present instance, the window is a casement window having the frame 1 and the sash 2. As illustrated, both the frame and sash are formed of Z-bars which in the closed position of the sash afford a double contact between the frame and sash. The sash, as shown, is adapted to swing horizontally outwardly with respect to the frame and is mounted upon a pair of vertically aligned hinges 3 which are arranged at one side of the sash.

The hinges are alike and therefore but one will be described. Each hinge comprises the hinge members 4 and 5 in the nature of brackets secured to and extending transversely from the frame and sash. Each hinge also comprises a friction element for imposing frictional resistance to relative angular movement of the hinge members, the element comprising a bushing extending through the hinge members at their free ends and a device for controlling the frictional resistance. The bushing is formed of the two bushing members

2

6 and 7, each of which has the angularly spaced segmental tongue portions 8 with the tongue portions of one bushing member fitting the tongue portions of the other member and cooperating therewith to form a journal for the hinge members 4 and 5. Each bushing member also has the flange portion 9 extending transversely of the tongue portions and located adjacent and abutting the outer side of one of the hinge members. 10 is a washer encircling the tongue portions 8 and located between the hinge members for separating the same. The device for controlling the frictional resistance comprises the bolt 11 and the nut 12, the bolt extending through the bushing members and having the head 13 which abuts the washer 14 which is turn abuts the flange portion 9 of one of the bushing members and the nut being threaded upon the shank of the bolt and abutting the washer 15 which in turn abuts the flange portion of the other of the bushing members. The washer 15 is preferably a lockwasher.

It will be seen that by tightening the nut 12 upon the bolt 11 the nut and the head of the bolt cooperate to clamp the flange portions 9 of the bushing members 6 and 7 against the outer sides of the hinge members 4 and 5 and these members in turn against the washer 10 to thereby impose a frictional resistance to relative angular movement of the hinge members. It will be noted that the tongue portions of the bushing members cooperate to effectively hold the bushing members from relative rotation. It will also be noted that the nut and bolt are free of contact with the relatively movable hinge members. Instead, they engage the sleeve formed by bushing members 6 and 7 which is movable or rotatable as a unit so that when the nut is adjusted it does not lose its adjustment accidentally by reason of angular movement of the hinge members as, for example, when the sash is being swung relative to the frame.

What I claim as my invention is:

1. A friction hinge comprising relatively angularly movable hinge members extending side by side, bushing members extending through said hinge members and operatively connected to each other to be held from relative rotation, a threaded member extending through said bushing members and having a head at one end thereof at one side of one of said hinge members, and a threaded member at the other end of said bushing members and at the other side of the other of said hinge members and threaded on and cooperating with said first mentioned threaded member to control frictional resistance to relative angular movement of said hinge members, said threaded members being movable as a unit during relative angular movement of said hinge members.

2. A friction hinge comprising relatively angularly movable hinge members, bushing members relatively movable axially of each other and extending through and forming a journal for said hinge members, said bushing members being operatively connected to each other to be held from relative angular movement, and means extending within said bushing members for controlling the frictional resistance to relative angular movement of said hinge members comprising cooperating threaded members held from connection with said hinge members by said bushing members.

3. A friction hinge comprising relatively angularly movable hinge members, bushing members relatively movable axially of each other and having journal portions extending through said hinge members and flange portions at the outer sides of said hinge members, said bushing members being operatively connected to each other to be held from relative angular movement, and means extending through said bushing members for holding said flange portions against said hinge members to oppose frictional resistance to relative angular movement of said hinge members.

4. A friction hinge comprising relatively angularly movable hinge members, bushing members having interfitting tongue portions holding said bushing members from relative angular movement and forming a journal for said hinge members, said bushing members also having flange portions at the outer sides of said hinge members, a bolt extending through said bushing members and having a head at the outer side of one of said flange portions, and a nut at the outer side of the other of said flange portions and threaded on said bolt, said nut cooperating with said bolt to control the frictional resistance to relative angular movement of said hinge members by said bushing members.

5. A friction hinge comprising relatively angularly movable hinge members having enlarged aligned pivot openings therethrough, a sleeve formed of a pair of oppositely headed bushing members extending through said openings, said members having interengaging portions preventing relative rotation while providing for relative movement axially of said openings, and threaded clamping means extending through said sleeve.

6. A friction hinge comprising relatively angularly movable hinge members having enlarged aligned pivot openings therethrough, a sleeve formed of a pair of oppositely headed bushing members extending through said openings and being rotatably received therein, said members having interengaging portions preventing relative rotation while providing for relative movement axially of said openings, and threaded clamping means extending through said sleeve.

CLYDE W. KELLY.

REFERENCES CITED

The following references are of record in the file of this patent:

UNITED STATES PATENTS

| Number | Name | Date |
|---|---|---|
| 1,619,107 | Enright | Mar. 1, 1927 |
| 1,768,810 | Walton | July 1, 1930 |